(12) United States Patent
Matuchniak et al.

(10) Patent No.: US 9,081,936 B2
(45) Date of Patent: Jul. 14, 2015

(54) SYSTEM AND METHOD FOR TRACKING A DOWNLOADED DIGITAL MEDIA FILE

(75) Inventors: Peter Tadeusz Matuchniak, Orange, CA (US); Bryan Bledstein, Orange, CA (US); Walterlance Ware, Huntington Beach, CA (US)

(73) Assignee: THOMSON LICENSING, LLC, Issy-les Moulineaux (FR)

( * ) Notice: Subject to any disclaimer, the term of this patent is extended or adjusted under 35 U.S.C. 154(b) by 844 days.

(21) Appl. No.: 12/742,740

(22) PCT Filed: Nov. 12, 2008

(86) PCT No.: PCT/US2008/012700
§ 371 (c)(1),
(2), (4) Date: May 13, 2010

(87) PCT Pub. No.: WO2009/067158
PCT Pub. Date: May 28, 2009

(65) Prior Publication Data
US 2010/0257350 A1 Oct. 7, 2010

Related U.S. Application Data

(60) Provisional application No. 61/003,333, filed on Nov. 16, 2007.

(51) Int. Cl.
*G06F 12/16* (2006.01)
*G06F 21/10* (2013.01)
*G06Q 50/18* (2012.01)

(52) U.S. Cl.
CPC .............. *G06F 21/10* (2013.01); *G06Q 50/184* (2013.01); *G06F 2221/0733* (2013.01)

(58) Field of Classification Search
USPC .......................................... 713/150; 709/246
See application file for complete search history.

(56) References Cited

U.S. PATENT DOCUMENTS 7,191,332 B1 * 3/2007 Pankajakshan et al. ...... 713/163
7,415,439 B2    8/2008 Kontio et al.
(Continued)

FOREIGN PATENT DOCUMENTS

CN    1572085 A    10/2002
CN    1610914 A    1/2003
(Continued)

OTHER PUBLICATIONS

Search Report did Jun. 25, 2009.

*Primary Examiner* — Christopher Brown
(74) *Attorney, Agent, or Firm* — Robert D. Shedd; Vincent E. Duffy; Michael A. Pugel (57) ABSTRACT

A system and method for tracking a downloaded digital media file which employs reheader splicing of the digit media file for digital rights management (DRM) are provided. The system and method provide for receiving a request for a first file from a client, accessing the first file and a second file that is representative of the first file, applying data identifying the client into the second file, and combining the first and second file such that a size of the combined file is substantially the same size as the accessed first file, and downloading the combined first and second file to the client. The combining of the first and second file includes replacing corresponding object components of the first file with the objects components of the second file. The data identifying the client includes at least one of a transaction ID, merchant ID, user ID and order ID.

14 Claims, 8 Drawing Sheets

(56) References Cited

U.S. PATENT DOCUMENTS

| | | | |
|---|---|---|---|
| 2003/0018582 A1* | 1/2003 | Yaacovi | 705/51 |
| 2003/0078890 A1 | 4/2003 | Schmidt et al. | |
| 2003/0126086 A1 | 7/2003 | Safadi | |
| 2005/0044391 A1* | 2/2005 | Noguchi et al. | 713/193 |
| 2005/0060549 A1 | 3/2005 | England et al. | |
| 2005/0086354 A1* | 4/2005 | Orchard | 709/231 |
| 2006/0062426 A1 | 3/2006 | Levy et al. | |
| 2006/0212363 A1 | 9/2006 | Peinado et al. | |
| 2007/0016956 A1* | 1/2007 | Bellwood et al. | 726/26 |
| 2007/0233601 A1* | 10/2007 | Nakada et al. | 705/51 |
| 2008/0195621 A1* | 8/2008 | Tedesco et al. | 707/9 |

FOREIGN PATENT DOCUMENTS

| | | |
|---|---|---|
| JP | 4232530 | 8/1992 |
| JP | 2004110277 | 4/2004 |
| JP | 200478381 | 5/2004 |
| JP | 200648188 | 2/2006 |
| WO | WO 2006/038204 A1 | 4/2006 |

* cited by examiner

| Name | Date modified | Type | Size |
|---|---|---|---|
| _temp.809274014160_00001_128.wma | 6/22/2007 9:26 AM | Windows Media A... | 25 KB |
| _temp.809274014160_00001_128.wma.xml | 6/22/2007 9:26 AM | XML Document | 66 KB |
| 809274014160_00001_128.wma | 6/22/2007 9:25 AM | Windows Media A... | 3,643 KB |
| 809274014160_00001_128.wma.xml | 6/22/2007 9:26 AM | XML Document | 61 KB |

FIG. 4

```
- <asf>
  - <asf_media>
      <content_id>6418</content_id>
      <content_guid>70c9b7ff-65e4-4427-8f2e-9f74c9f6593c</content_guid>
      <media_file>_temp.809274014160_00001_128.wma</media_file>
      <media_path>\\ATOS\public\global.synccast.com\content\WEADSP\contentroot\7\0\c\9</media_path>
      <split_path>\\ATOS\public\global.synccast.com\content\WEADSP\contentroot\7\0\c\9
        \_temp.809274014160_00001_128.wma.split</split_path>
      <split_files_exist>False</split_files_exist>
      <media_file_size>25028</media_file_size>
      <asf_objects_total>13</asf_objects_total>
      <asf_sections_total>41</asf_sections_total>
      <asf_header_obj_total>11</asf_header_obj_total>
    </asf_media>
  - <asf_objects>
    - <asf_object asfobj_guid="3026B2758E66CF11A6D900AA0062CE6C">
        <object_seq>1</object_seq>
        <offset>0</offset>
        <size>30</size>
        <guid>3026B2758E66CF11A6D900AA0062CE6C</guid>
        <desc>ASF_Header_Object</desc>
        <type>TopLevelObject</type>
        <level_mode>ASF_Header_Object</level_mode>
        <media_file>_temp.809274014160_00001_128.wma</media_file>
        <media_path>\\ATOS\public\global.synccast.com\content\WEADSP\contentroot\7\0\c\9</media_path>
        <split_path>\\ATOS\public\global.synccast.com\content\WEADSP\contentroot\7\0\c\9
          \_temp.809274014160_00001_128.wma.split</split_path>
        <split_file>0010._temp.809274014160_00001_128.wma.TopLevelObject.ASF_Header_Object.asfobj</split_file>
        <split_file_exists>False</split_file_exists>
      </asf_object>
    - <asf_object asfobj_guid="A1DCAB8C47A9CF118EE400C00C205365">
        <object_seq>2</object_seq>
        <offset>30</offset>
        <size>104</size>
        <guid>A1DCAB8C47A9CF118EE400C00C205365</guid>
        <desc>ASF_File_Properties_Object</desc>
        <type>HeaderObject</type>
        <level_mode>ASF_Header_Object</level_mode>
        <media_file>_temp.809274014160_00001_128.wma</media_file>
        <media_path>\\ATOS\public\global.synccast.com\content\WEADSP\contentroot\7\0\c\9</media_path>
        <split_path>\\ATOS\public\global.synccast.com\content\WEADSP\contentroot\7\0\c\9
          \_temp.809274014160_00001_128.wma.split</split_path>
        <split_file>0020._temp.809274014160_00001_128.wma.HeaderObject.ASF_File_Properties_Object.asfobj</split_file>
        <split_file_exists>False</split_file_exists>
      </asf_object>
```

FIG. 5

```
- <asf>
+ <asf_media>
+ <asf_objects>
- <asf_sections>
   - <asf_section name="ASF_Header_Object.OBJECT_GUID">
       <section_seq>1</section_seq>
       <offset>0</offset>
       <ending>15</ending>
       <size>16</size>
       <section_id>ASF_Header_Object.OBJECT_GUID</section_id>
       <section_name>OBJECT_GUID</section_name>
       <reassemble_action>COPY_AS_IS</reassemble_action>
       <part_of_object_guid>3026B2758E66CF11A6D900AA0062CE6C</part_of_object_guid>
       <part_of_object_desc>ASF_Header_Object</part_of_object_desc>
       <part_of_object_type>TopLevelObject</part_of_object_type>
       <level_mode>ASF_Header_Object</level_mode>
       <media_file>_temp.809274014160_00001_128.wma</media_file>
       <media_path>\\ATOS\public\global.synccast.com\content\WEADSP\contentroot\7\0\c\9</media_path>
       <split_path>\\ATOS\public\global.synccast.com\content\WEADSP\contentroot\7\0\c\9
           \_temp.809274014160_00001_128.wma.split</split_path>
       <split_file>0010._temp.809274014160_00001_128.wma.TopLevelObject.ASF_Header_Object.asfobj</split_file>
       <split_file_exists>True</split_file_exists>
       <section_value_hex>3026B2758E66CF11A6D900AA0062CE6C</section_value_hex>
       <content_id>6418</content_id>
       <content_guid>70c9b7ff-65e4-4427-8f2e-9f74c9f6593c</content_guid>
     </asf_section>
   - <asf_section name="ASF_Header_Object.OBJECT_SIZE">
       <section_seq>2</section_seq>
       <offset>16</offset>
       <ending>23</ending>
       <size>8</size>
       <section_id>ASF_Header_Object.OBJECT_SIZE</section_id>
       <section_name>OBJECT_SIZE</section_name>
       <reassemble_action>RECALCULATE</reassemble_action>
       <part_of_object_guid>3026B2758E66CF11A6D900AA0062CE6C</part_of_object_guid>
       <part_of_object_desc>ASF_Header_Object</part_of_object_desc>
       <part_of_object_type>TopLevelObject</part_of_object_type>
       <level_mode>ASF_Header_Object</level_mode>
       <media_file>_temp.809274014160_00001_128.wma</media_file>
       <media_path>\\ATOS\public\global.synccast.com\content\WEADSP\contentroot\7\0\c\9</media_path>
       <split_path>\\ATOS\public\global.synccast.com\content\WEADSP\contentroot\7\0\c\9
           \_temp.809274014160_00001_128.wma.split</split_path>
       <split_file>0010._temp.809274014160_00001_128.wma.TopLevelObject.ASF_Header_Object.asfobj</split_file>
       <split_file_exists>True</split_file_exists>
       <section_value>7018</section_value>
       <section_value_hex>6A1B000000000000</section_value_hex>
       <content_id>6418</content_id>
       <content_guid>70c9b7ff-65e4-4427-8f2e-9f74c9f6593c</content_guid>
     </asf_section>
   - <asf_section name="ASF_Header_Object.end">
       <section_seq>3</section_seq>
```

Comparing Sections

| | |
|---|---|
| SAME: | 0010_TopLevelObject_ASF_Header_Object.asfobj |
| SAME: | 0020_HeaderObject_ASF_Content_Description_Object.asfobj |
| SAME: | 0030_HeaderObject_ASF_Extended_Content_Description_Object.asfobj |
| SAME: | 0040_HeaderObject_ASF_Stream_Bitrate_Properties_Object.asfobj |
| SAME: | 0050_HeaderObject_ASF_File_Properties_Object.asfobj |
| DIFF: | 0060_HeaderObject_ASF_Extended_Content_Encryption_Object.asfobj |
| DIFF: | 0070_HeaderObject_ASF_Content_Encryption_Object.asfobj |
| DIFF: | 0080_HeaderObject_ASF_Digital_Signature_Object.asfobj |
| SAME: | 0090_HeaderObject_ASF_Header_Extension_Object.asfobj |
| SAME: | 0100_HeaderObject_ASF_Stream_Properties_Object.asfobj |
| SAME: | 0110_HeaderObject_ASF_Codec_List_Object.asfobj |
| SAME: | 0120_HeaderObject_ASF_Script_Command_Object.asfobj |
| DIFF: | 0130_TopLevelObject_ASF_Data_Object.asfobj |

FIG. 9

SYSTEM AND METHOD FOR TRACKING A DOWNLOADED DIGITAL MEDIA FILE

This application claims the benefit under 35 U.S.C. §365 of International Application PCT/US2008/012700, filed Nov. 12, 2008, which was published in accordance with PCT article 21(2) on May 28, 2009, and republished on Aug. 6, 2009 in English and which claims the benefit under 35 U.S.C.§119 of a provisional application 61/003,333, filed in the United States on Nov. 16, 2007

TECHNICAL FIELD OF THE INVENTION

The present disclosure generally relates to computer graphics processing and display systems, and more particularly, to a system and method for tracking a downloaded digital media file which employs reheader splicing of the digit media file for digital rights management (DRM).

BACKGROUND OF THE INVENTION

With the proliferation of digital media and analog/digital conversion technologies, concerns of copyright-dependent organizations, especially within the music and movie industries, have significantly increased. While analog media inevitably loses quality with each copy generation and in some cases even during normal use, digital media files may be duplicated an unlimited number of times with no degradation in the quality of subsequent copies. Personal computers as household appliances, along with other portable digital media devices such as MP3 players, have made it convenient for consumers to convert media (which may or may not be copyrighted) originally in a physical/analog form or a broadcast form into a universal, digital form for location or time shifting. Furthermore, combined with the Internet and popular file sharing tools, personal computers have made unauthorized distribution of copies of copyrighted digital media much easier.

Digital rights management (DRM) technologies attempt to control use of digital media by preventing access, copying or conversion to other formats by end users, as well as controlling distribution. Various DRM systems have been employed to protect the copyrights and other intellectual property rights of digital media content creators and publishers. One such DRM system includes an encryption scheme where a key is associated with an ID number of a user's personal computer and the key only decodes the digital media when accessed from that specific computer. Other encryption schemes use limited-use encryption where a key decodes the digital media for a limited period of time. Another DRM system employs Web-based permission, where a user's computer contacts a license-verification server over the Internet to get permission, e.g., an access key, to access or play the digital media. Furthermore, some DRM systems mark the digital media with a digital watermark to prevent free distribution of the digital media content by including copyright information in the digital media as bits of information that require a special program for reading.

In addition to controlling the distribution of digital media, a need exists for techniques for embedding information into a copy of the digital media relating to a particular transaction so the digital media can be tracked.

SUMMARY

A system and method for tracking a downloaded digital media file which employs reheader splicing of the digit media file for digital rights management (DRM) are provided. The system and method of the present disclosure allows digitally signed and encoded Windows Media files (i.e., Advanced System Format (ASF) files) to be injected with information that is unique per transaction and to do so in an efficient manner. Thus, any request for a DRM license prompted by attempting to play the digital media file can be uniquely tied back to a specific download transaction. Furthermore, the relative cost of doing this in real-time is potentially minimized with the time saving increasing directly proportional to the ASF file size.

According to one aspect of the present disclosure, a method for tracking a downloaded file is provided including steps of receiving a request for a first file from a client, accessing the first file and a second file that is representative of the first file, applying data identifying the client into the second file, and combining the first file and the second file such that a size of the combined first and second file is substantially the same size as the accessed first file. The method further includes downloading the combined first and second file to the client.

In another aspect, the method further includes deleting the combined first and second file and the second file having the client data after downloading.

In a further aspect, the combining step includes replacing corresponding object components of the first file with the objects components of the second file including the applied data. In one embodiment, the object components are ASF objects.

In another aspect, the data identifying the client includes at least one of a transaction ID, merchant ID, user ID and order ID.

According to a further aspect of the present disclosure, the method further includes receiving the first file from a content owner, generating the second file that is representative of the first file, and encrypting the first and second files using an identical encryption key. The method generates a first map of object components contained in the first file and a second map of object components in the second file. Furthermore, the method determines which object components of the second file include the data identifying the client, and splices the determined object components of the second file into corresponding object components of the first file.

According to another aspect of the present disclosure, a system for tracking a downloaded file is provided. The system includes a communication module, element, component or the like for receiving a request for a first file from a client, a digital right management module, element, component or the like for accessing the first file and a second file that is representative of the first file, a reheadering module, element, component or the like applying data identifying the client into the second file, and a splicer for combining the first file and the second file such that a size of the combined first and second file is substantially the same size as the accessed first file. The communication module is further adapted for downloading the combined first and second file to the client.

In another aspect, the system includes an object map generator for generating a first map of object components contained in the first file and a second map of object components in the second file. Furthermore, the splicer is further adapted for determining which object components of the second file include the data identifying the client and splicing the determined object components of the second file into corresponding object components of the first file.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views:

FIG. 4 is a screen shot illustrating a first media file and its associated second file along with corresponding XML formatted files describing the first and second files' ASF objects and their address pointers respectively;

FIGS. 5 and 6 illustrate the mapping of the second smaller file in an XML format where FIG. 5 shows the second file's media information and ASF objects and FIG. 6 shows the second file's ASF sections that will be used for splicing;

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

A system and method for tracking a downloaded digital media file which employs reheader splicing of the digit media file for digital rights management (DRM) are provided. The system and method of the present disclosure allows digitally signed and encoded Windows Media files (e.g., ASF files) to be injected with information that is unique per transaction and to do so in an efficient manner. Thus, any request for a DRM license prompted by attempting to play the digital media file can be uniquely tied back to a specific download transaction. Furthermore, the relative cost of doing this in real-time is potentially minimized with the time saving increasing directly proportional to the ASF file size.

The system and method of the present disclosure provides to uniquely identify each and every downloaded media file. Although this is possible with a conventional function, it is not always practical to use that function; firstly, the conventional examples show usage within the ASP file, and secondly, issues arise with processing large (typically video) media files. Specifically, the conventional function processes the whole file which leads to performance and scalability limitations when processing large media files. The system and method of the present disclosure is unique in that it does not re-process the entire original file, but instead it processes a tiny representative file, which is then spliced together with the original file. The tiny file is encrypted with the same key as the main original media file, and this enables the system and method to perform reheader splicing without affecting the end result of having a playable media file.

The purpose of the present disclosure is twofold: (1) to write information into a digitally signed Windows Media file (e.g., a ASF file) that is unique per user download (i.e., per transaction) and (2) to do so in an efficient manner that does not require the entire ASF file to be re-encoded nor reheadered in its entirety.

For every application of the present disclosure, a pair of ASF files are involved. One of these is the "main" DRM-encoded ASF file and the other is a "tiny" companion file that shares the same digital signature and is generated specifically for use by the system and method of the present disclosure. The term "tiny" is used here because the file is much smaller than the original "main" media content file. Unique transaction-specific information is written into the tiny companion file, which is then split up into its constituent ASF object components. Using only the altered ASF objects from the tiny file, the respective sections are then spliced or combined into the main ASF file, thereby replacing those sections and creating a new main-unique ASF file. This new file will be playable as a regular DRM-encoded Windows Media file, and any attempts to obtain rights to play this file will result in unique information being passed to a license server.

One major challenge met by the present disclosure that went beyond splicing is the fact that the system and method has to adjust all the byte address pointers between parent (e.g., the main media content file) and child (e.g., the tiny media content file) component if the resulting ASF component objects differ in size to the original. To simplify the logic, the system and method uses the XML format to store all the address pointers for each section and an action to indicate which sections need to be considered for modification, replacement or both (or neither). This XML file has to be stored for each and every media file as well as its paired tiny file.

Figure 1:
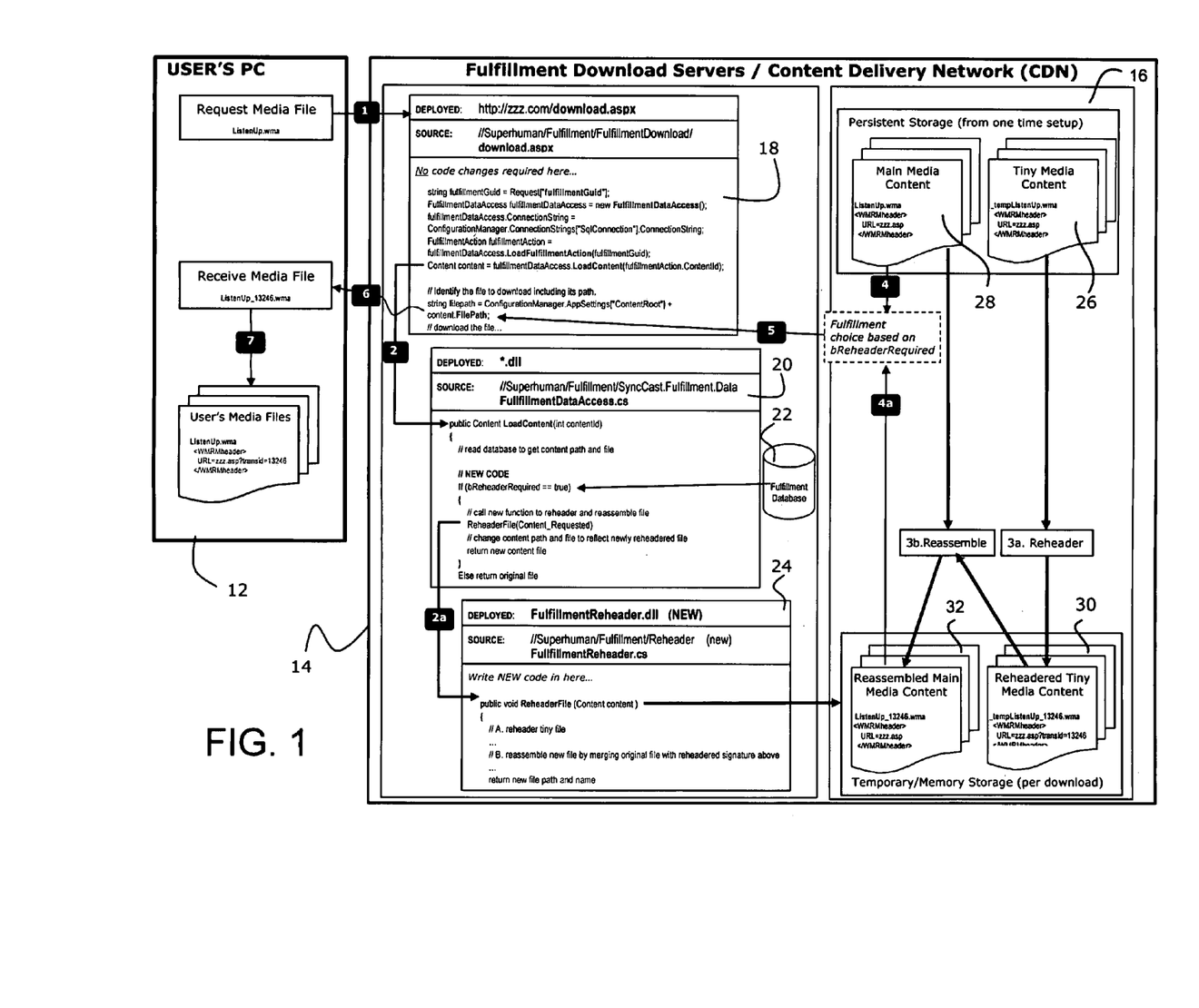
FIG. 1 illustrates a system and method for tracking a downloaded file in accordance with the present disclosure.

Referring to FIG. 1, a system and method for tracking a downloaded file in accordance with the present disclosure is provided. Generally, in step 1, a user requests a media file via the user's personal computer (PC) 12. Fulfillment download servers 14 facilitate the download of content (i.e., media files) from the content storage 16 (content delivery network) to the end-user's PC 12 via the web page "download.aspx" 18. It is to be appreciated that the content storage 16 may be a storage device in the fulfillment download server 14 or could be a separate server storing content as part of a content delivery network. In step 2, the "FulfillmentDataAccess.cs" code 20 is deployed to see if reheadering should be applied to the media file before downloading to the user's PC 12. This check is performed in the "FulfillmentDataAccess.cs" code 20 in the form of a read to the fulfillment database 22 and returned in the boolean value "bReheaderRequired". If this is TRUE then the new function "ReheaderFile" 24 is invoked, in step 2a, and the file is altered before being downloaded as will be described below. Otherwise, the unaltered copy of the original main media content file 28 is downloaded directly from the fulfillment database 22, in steps 4, 5 and 6. It is to be appreciated that an unaltered copy may be downloaded when there is no copyright associated with the media file or when the media file is being freely distributed by a content provider.

In step 3a, the "ReheaderFile" function, performed in the "FulfillmentReheader.cs" code 24, applies reheadering to a tiny media content file 26, i.e., the second media file representative of the first main media file 28, resulting in reheadered tiny media content file 30. This tiny or second file 26 has already been encrypted with the same keys as the requested main media content file. In step 3b, the reheadered tiny media content file 30 is then spliced into the requested media file resulting in a reassembled main media content file 32. The updated media file 32 now has unique information embedded in it that is specific to this download request (which may include, amongst other things, the following: a transaction ID, merchant ID, user ID, order ID, etc.). In step 5, the download application will be repointed to use the updated media file 32 for the end-user and the file will be downloaded to the user's PC 12, in steps 6 and 7. Following a successful download, the reheadered tiny media content file 30 and the reassembled main media content file 32 may be removed, either from memory or from temporary storage, depending on configuration parameters of the system.

Figure 2:
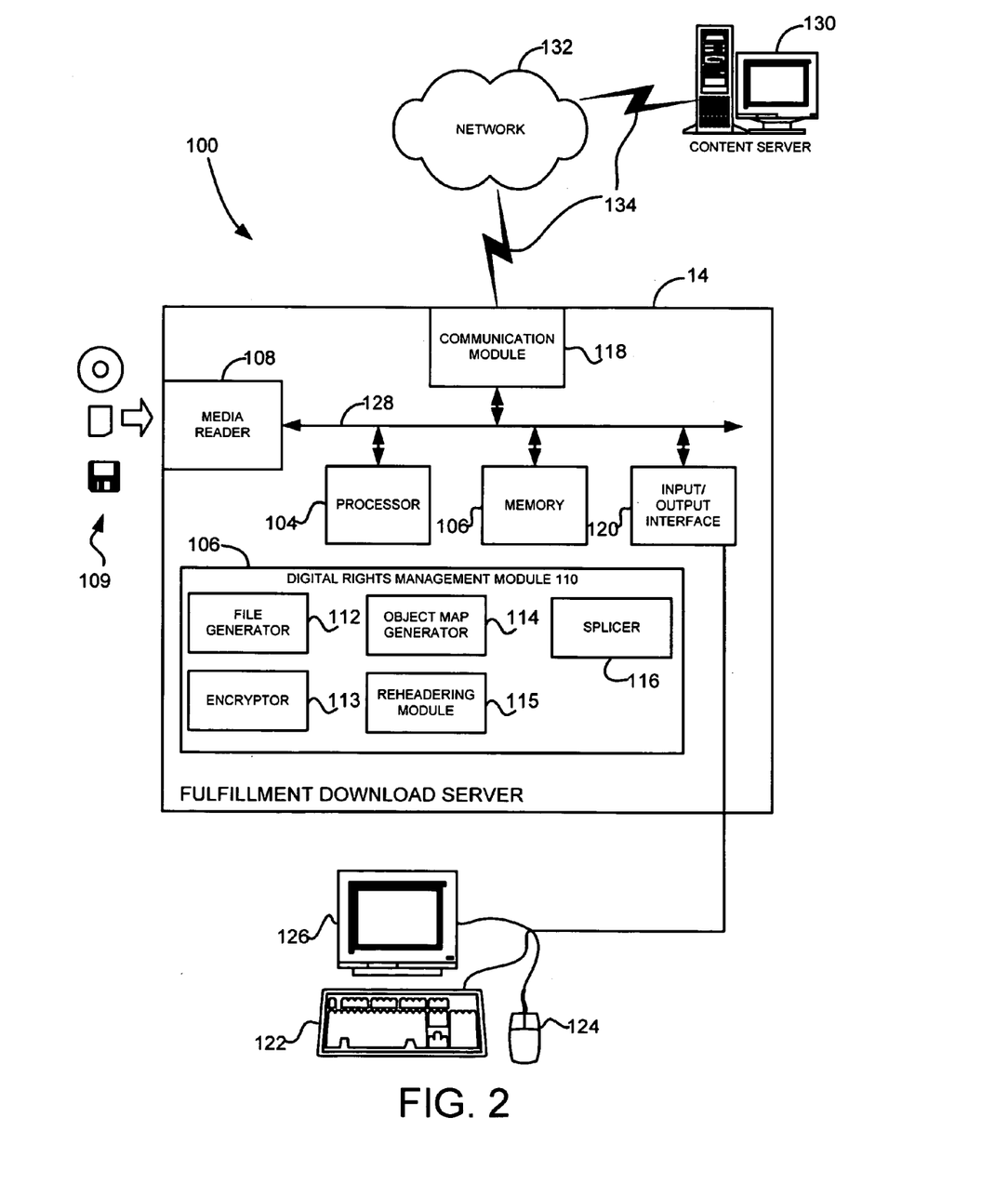
FIG. 2 is an exemplary server for tracking a downloaded file in accordance with the present disclosure.

Referring to FIG. 2, a system 100 and an exemplary server 14 for tracking a downloaded file in accordance with the present disclosure is illustrated. The server, e.g., fulfillment download server 14, is implemented on any of the various known computer platforms having hardware such as one or more central processing units (CPU) 104, memory 106 such as random access memory (RAM) and/or read only memory (ROM) and input/output (I/O) user interface(s) 120 such as a keyboard 122, cursor control device 124 (e.g., a mouse or joystick) and display device 126. A system bus 128 couples the various components and may be any of several types of bus structures including a memory bus or memory controller, a peripheral bus, and a local bus using any of a variety of bus architectures. The computer platform also includes an operating system and micro instruction code. The various processes and functions described herein may either be part of the micro instruction code or part of the software application program (or a combination thereof) which is executed via the operating system. In one embodiment, the software application program is tangibly embodied on a program storage device, which may be uploaded to and executed by any suitable machine such as server 14.

In addition, various other peripheral devices may be connected to the computer platform of the server or machine by various interfaces and bus structures, such a parallel port, serial port or universal serial bus (USB). One such peripheral device may include a communication module, element or component 118, e.g., a modem, satellite relay, wireless connection, etc., for enabling communications from the server 14 to various content servers 130 and various user PCs 12. Another device may include a media reader 108 for reading various types of external storage media 109. Other peripheral devices may include additional storage devices, a printer and a scanner.

The server 14 may operate in a networked environment using logical connections to one or more remote computers, e.g., user PCs 12, content server 130, etc. The remote computer may be a personal computer, a server, a router, a network PC, a peer device or other common network node, and typically includes many or all of the elements described above relative to the machine. It is to be appreciated that the network 132 may be a local area network (LAN), wide area network (WAN), the Internet or any known network that couples a plurality of computers to enable various modes of communication via network messages. The server 14 may communicate to the server 130 and network 132 via any known communication link 134, for example, dial-up, hard-wired, cable, DSL, satellite, cellular, PCS, wireless transmission (e.g., 802.11a/b/g, etc.), etc. Furthermore, the devices will communicate using the various known protocols such as Transmission Control Protocol/Internet Protocol (TCP/IP), File Transfer Protocol (FTP), Hypertext Transfer Protocol (HTTP), etc. During a purchasing transaction, the computing devices may employ Hypertext Transfer Protocol Secure (HTTPs), Secure Sockets Layer (SSL) Protocol, Secure Electronic Transaction (SEC) Protocol, etc.

A software program includes a digital rights management module, element or component 110 stored in the memory 106 for tracking a downloaded file. The digital rights management module 110 will include various modules that interact to perform the various functions and features provided in the present disclosure. The digital rights management module 110 includes a file generator 112 which is provided for generating the tiny or second file representative of the first main media file. It is to be appreciated that the tiny or second file could be an empty file or simply include a small portion of the media content contained in the first main media file. An encryptor 113 is provided for encrypting the first main media file and the second file with the same identical encryption key K1.

The digital rights management module 110 further includes an object map generator 114 for generating object component maps for the first and second file in XML format. A reheadering module, element or component 115 is provided for rehearing the tiny or second file with information that is specific to a particular download or transaction. Furthermore, a splicer 116 is provided for splicing object components from the tiny or second file into the first main media file.

Figure 3:
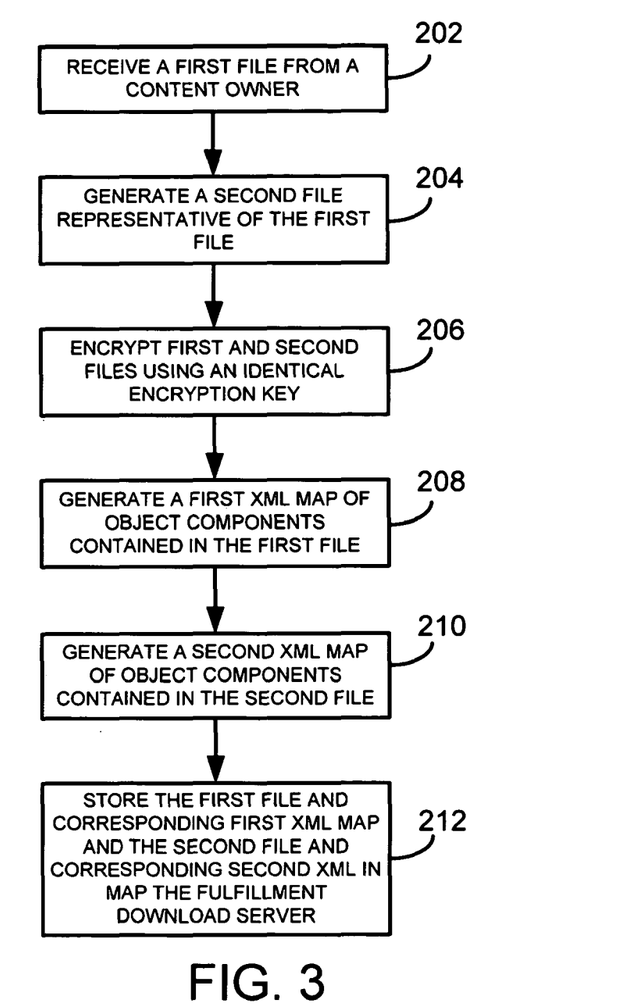
FIG. 3 is a flow diagram of an exemplary method for ingesting a file in accordance with the present disclosure.

Referring to FIG. 3, a flow diagram of an exemplary method for ingesting a first main media content file 28 in accordance with the present disclosure is provided. Initially in step 202, a first main media content file is received by the fulfillment download server 14 from a content owner. The first main media content file 28 may by received from a content server 130 via the communication module 118 or may be read from an external media storage device 109 via media reader 108. The file generator 112 then generates the tiny media content file 26, i.e., the second file representative of the first main media content file, in step 204. Next, at step 206, the encryptor 113 encrypts both the first main media content file 28 and the tiny media content file 26 with the identical encryption key K1.

In steps 208 and 210, the object map generator 114 generates object component maps for the first and second file in XML format. Next, in step 212, the first main media content file 28 and corresponding first XML map and the second tiny media content file 26 and corresponding second XML map are stored in the fulfillment download server 14. FIG. 4 illustrates the resulting files to this point, for example, a first main media content file (809274014160_0001_128.wma) and its associated second file (temp.809274014160_0001_128.wma) along with corresponding XML formatted files respectively (809274014160_0001_128.wma.xml and temp.809274014160_0001_128.wma.xml). In one embodiment, the object components are ASF (Advanced Systems Format) objects. The maps are XML formatted files describing the first and second files ASF objects and their address pointers respectively. FIGS. 5 and 6 illustrate the mapping of the second smaller file in the XML format where FIG. 5 shows the second file's media information and ASF objects and FIG. 6 shows the second file's ASF sections that will be used for splicing.

Figure 7:
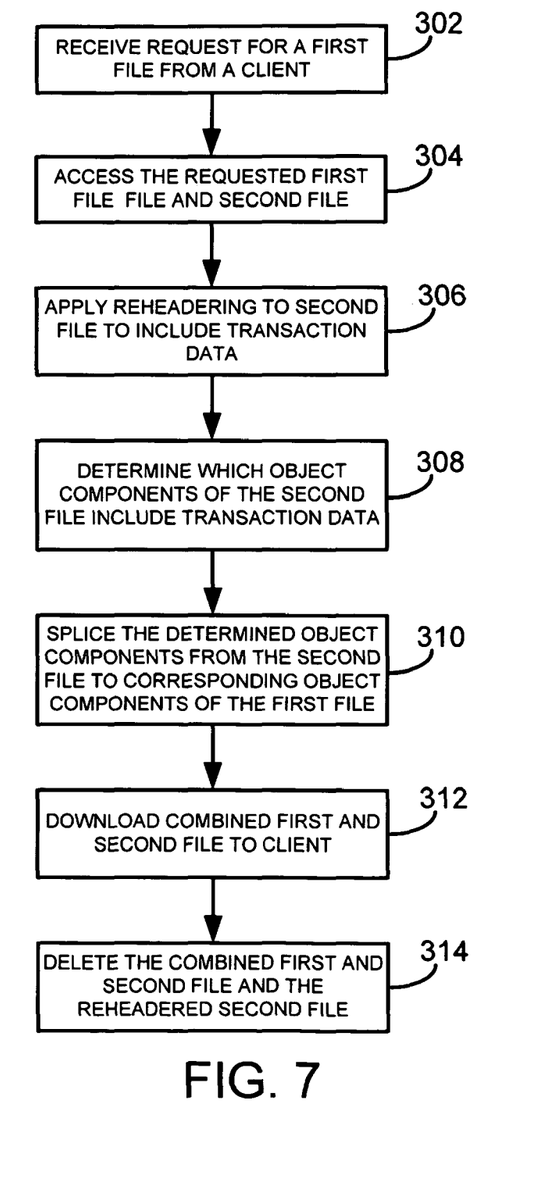
FIG. 7 is a flow diagram of an exemplary method for tracking a downloaded file in accordance with the present disclosure.
Figure 8:
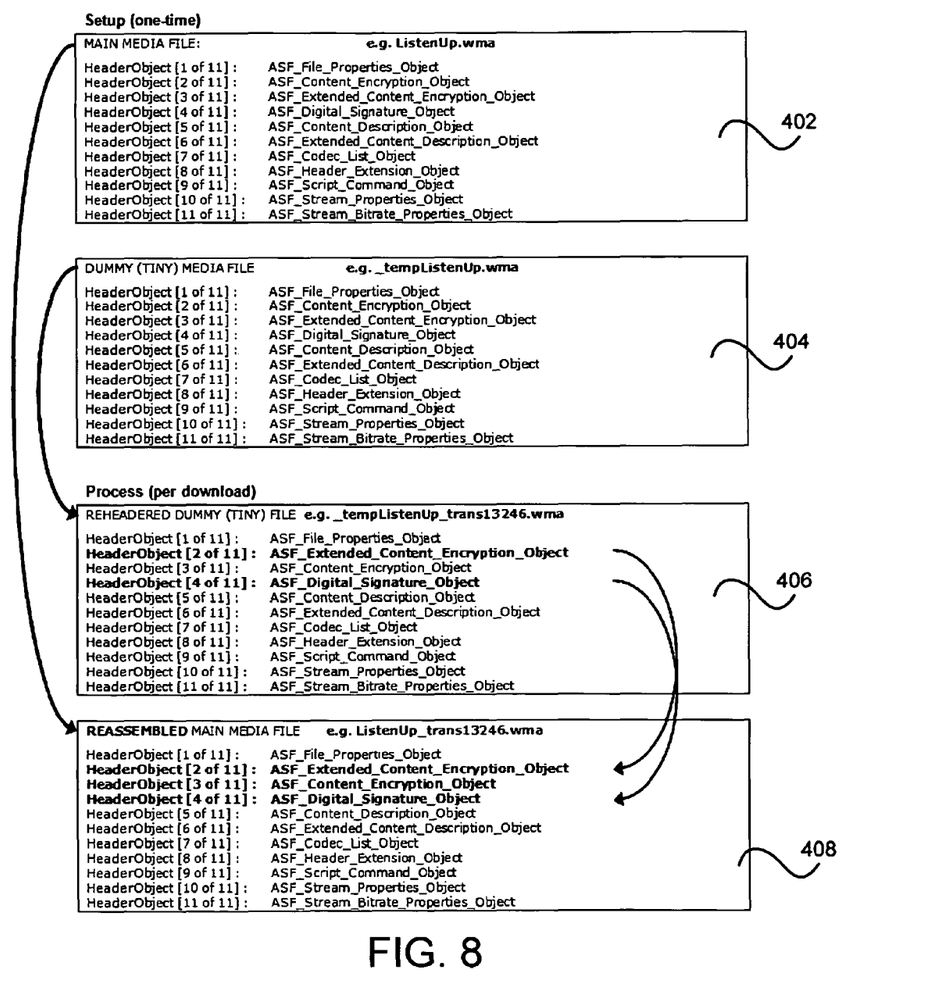
FIG. 8 illustrates how a second file is spliced into a first media file for downloading.

Referring to FIG. 7, a flow diagram of an exemplary method for tracking a downloaded file in accordance with the present disclosure is illustrated. Initially, in step 302, the fulfillment download server 14 receives a request from a client, e.g., a user's PC 12, for the first main media content file 28, e.g., an audio file of a song, a video file of a movie, etc. It is to be appreciated that the request will be sent over the network 132 and received by the communication module 118 of the server 14. Next, in step 304, the digital rights management module 110 accesses the requested first main media content file 28 and second file 26. The reheadering module 115 applies reheadering to the second file 26 to include in the second file information specific to the particular transaction, in step 306. This transaction specific information may include, amongst other things, a transaction ID, merchant ID, user ID, order ID, etc. Referring to FIG. 8, portions of the various files are shown illustrating the object components contained within each. As can be seen, the object components 402 of the first main media content file and the object components 404 of the second tiny media content file, created during the one-time ingestion process described above, are the same. Object components 406 illustrate the second tiny media content file after it has been reheadered in step 306.

Figure 9:
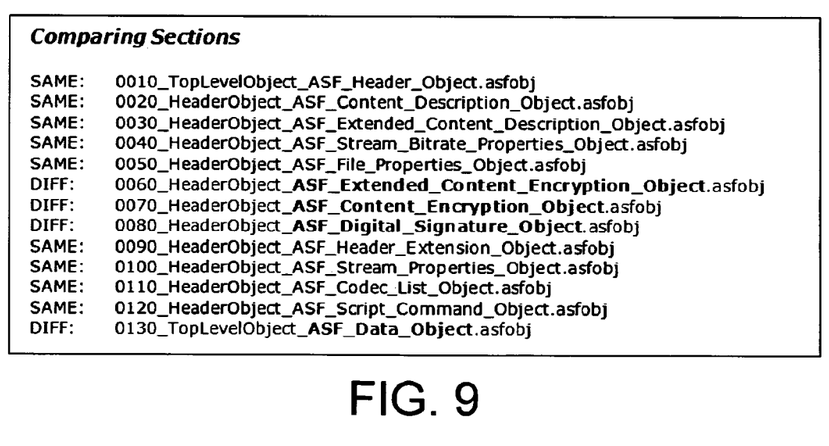
FIG. 9 illustrates the typical ASF objects within a media file with certain object designated as different (diff) which are to be spliced into the media file.

Next, in step 308, the splicer 116 determines which object components of the second file include the transaction data. In one embodiment, this can be accomplished by comparing object components from the two files and determining which object components are different. FIG. 9 illustrates an exemplary output from this comparison where typical ASF objects within a media file are shown with certain object designated as different (diff). The object components designated as different (diff) are those object components to be spliced into the first main media content file.

In step 310, the splicer 116 splices the determined object components 406 from the second tiny media content file into the corresponding object components of the first main media content file. The resulting object components 408 of the reassembled main media content file 32 are shown in FIG. 8. The reassembled main media content file 32, i.e., the combined first and second file, is then downloaded to the client, e.g., the user's PC 12, in step 312, via the network using any of the various known communication protocols. Once the download is complete, the reassembled main media content file 32 and the reheadered tiny media content file 30 are deleted by the digital rights management module 110 since these files contain information specific only to this transaction.

It is to be appreciated the first main media content file 28 will remain and be used for future downloads. Furthermore, the tiny media content file 26 and XML-formatted object component map files that are generated in advance during the "ingestion" process (as described in relation to FIG. 3) are never deleted and are therefore stored permanently. However, the altered or reheadered tiny media content file 30 which is generated during the download as part of applying the reheadering process, is discarded. This process may occur in memory (in which case, the memory allocated is simply reallocated for other use) or stored temporarily on a file disk (in which case, it is deleted at some point in the future, possibly immediately after download). The same applies to the spliced and modified main media content file 32 once the download has completed. The choice of using memory or the file system is mostly driven by performance and scalability requirements. The main advantage of using the file system for the spliced main media content file is to allow for resuming an interrupted file download, as well as for testing and verification purposes.

Although embodiments which incorporates the teachings of the present disclosure have been shown and described in detail herein, those skilled in the art can readily devise many other varied embodiments that still incorporate these teachings. Having described preferred embodiments of a system and method for tracking a downloaded file (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method for tracking a downloaded file implemented by a processor, the method comprising:
   receiving, by a processor, a request for a first file from a client;
   accessing, by the processor, said first file and a second file that is representative of said first file, said second file includes object components corresponding to object components of said first file;
   applying, by the processor, reheadering to said second file to include transaction data identifying said client;
   determining, by the processor, which object components of said second file include transaction data identifying said client;
   determining, by the processor, which object components of said second file include the applied transaction data;
   replacing, by the processor, corresponding object components of said first file with said determined object components of said second file including the applied transaction data to create a combined file such that a size of the combined file is substantially the same size as the accessed first file;
   and generating a first map of the object components contained in said first file and a second map of the object components in said second file, the first and second maps describing each object component and a respective byte address pointer, wherein the replacing of said corresponding object components of said first file with said determined object components of said second file is performed in accordance with the first and second maps.

2. The method as in claim 1, further comprising downloading the combined file to the client.

3. The method as in claim 2, further comprising deleting the combined file and said second file including the applied transaction data after downloading.

4. The method as in claim 1, wherein the transaction data identifying said client includes at least one of a transaction ID, merchant ID, user ID and order ID.

5. The method as in claim 1, wherein the object components are advanced system format objects.

6. The method as in claim 1, further comprising:
   receiving said first file from a content owner;
   generating said second file that is representative of said first file; and
   encrypting said first and second files using an identical encryption key.

7. The method as in claim 1, wherein the object components are advanced system format objects.

8. A system for tracking a downloaded file, the system comprising:
   a processor, the processor includes:
   a communication element for receiving a request for a first file from a client;
   a digital right management element for accessing said first file and a second file that is representative of said first file, said second file includes object components corresponding to object components of said first file;
   a reheadering element for applying reheadering to said second file to include transaction data identifying said client; a splicer element for determining which object components of said second file include the applied transaction data and replacing corresponding object components of said first file with said determined object components of said second file including the applied transaction data to create a combined file such that a size of the combined file is substantially the same size as the accessed first file;
   and an object map generator for generating a first map of object components contained in said first file and a second map of object components in said second file, the first and second maps describing each object component and a respective byte address pointer, wherein the splicer element replaces said corresponding object components of said first file with said determined object components of said second file in accordance with the first and second maps.

9. The system as in claim 8, wherein the communication element is further adapted for downloading the combined file to the client.

10. The system as in claim 9, wherein the digital right management element is further adapted for deleting the combined file and said second file including the applied transaction data after downloading.

11. The system as in claim 8, wherein the transaction data identifying said client includes at least one of a transaction ID, merchant ID, user ID and order ID.

12. The system as in claim 8, wherein the object components are advanced system format objects.

13. The system as in claim 8, wherein the communication element is further adapted for receiving said first file from a content owner, and the system further comprises:
   a file generator for generating said second file that is representative of said first file; and
   encryptor for encrypting said first and second files using an identical encryption key.

14. The system as in claim 13, wherein the object components are advanced system format objects.

* * * * *